Feb. 12, 1929.
G. R. HANKS
1,701,976
METHOD OF CONDITIONING ARTICLES OF MANGANESE STEEL
Filed June 22, 1925
5 Sheets-Sheet 1
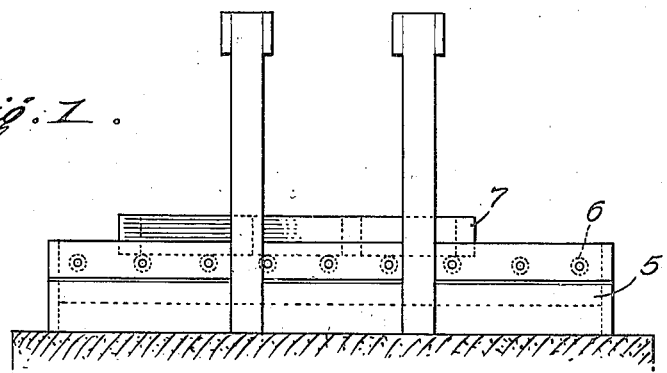
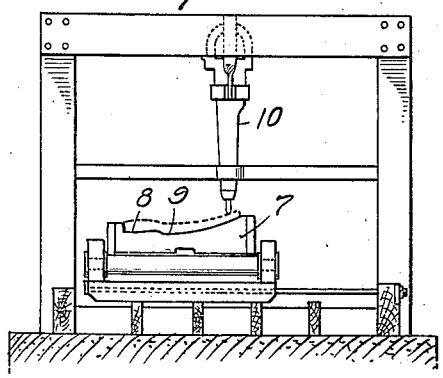
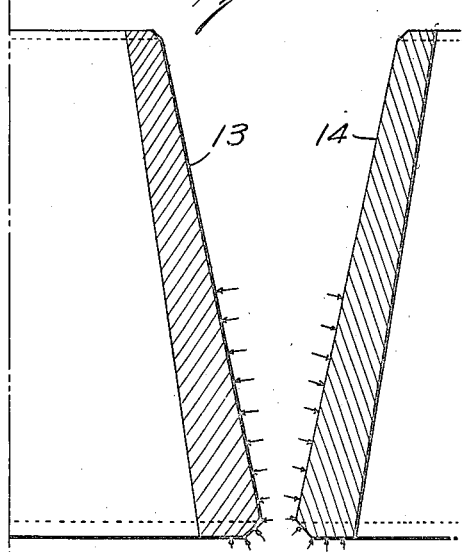
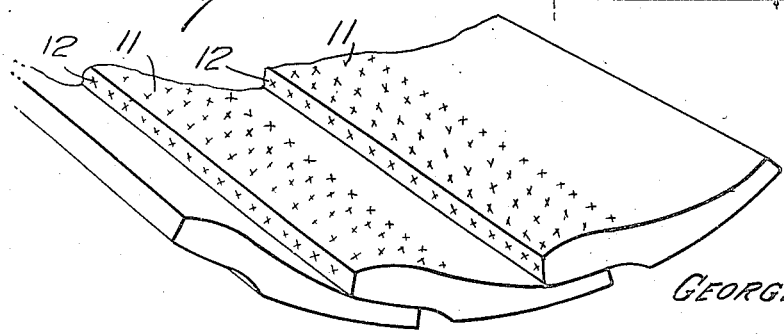
Inventor
GEORGE R. HANKS,
By Jack F. Richmond
Attorney

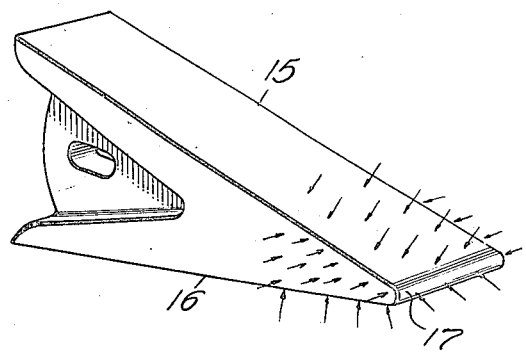
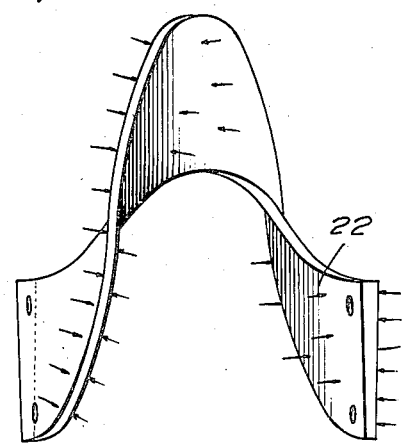
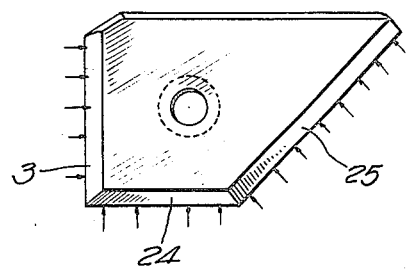
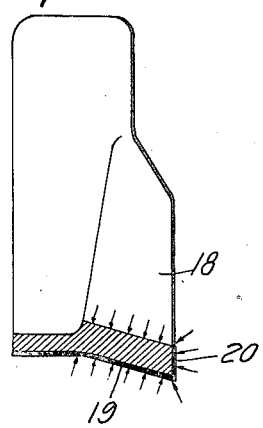
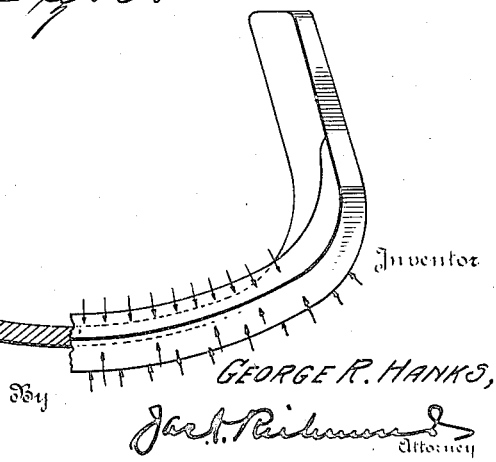

Feb. 12, 1929.
G. R. HANKS
1,701,976
METHOD OF CONDITIONING ARTICLES OF MANGANESE STEEL
Filed June 22, 1925    5 Sheets-Sheet 3
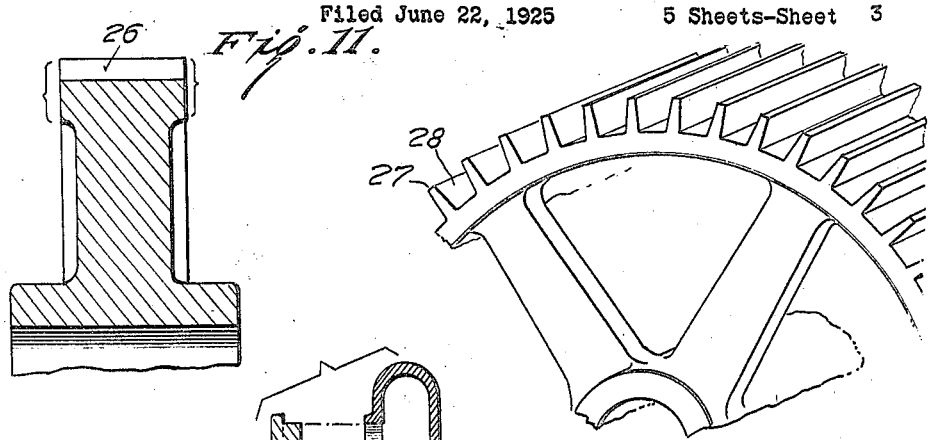
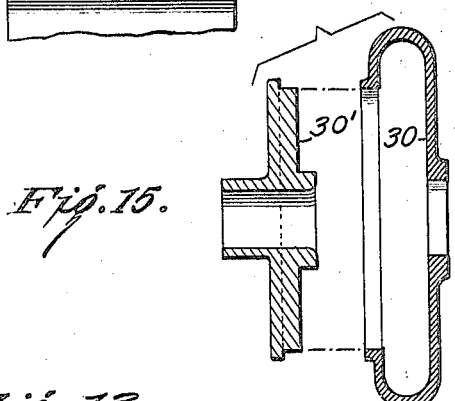
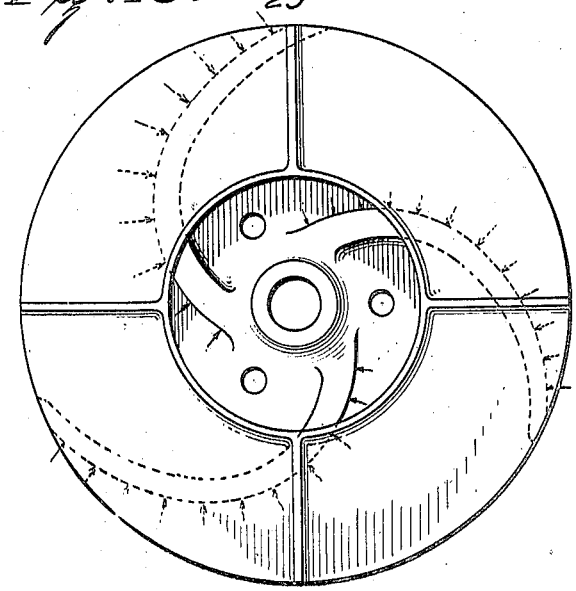
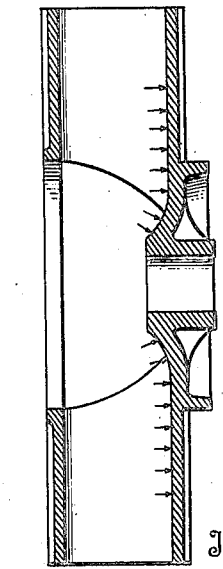
Inventor
GEORGE R. HANKS,
By  Attorney

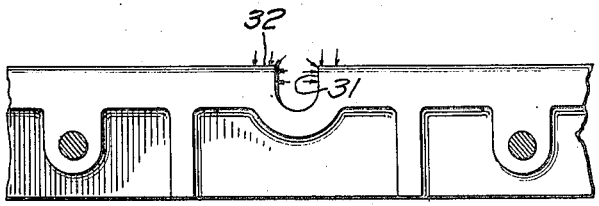
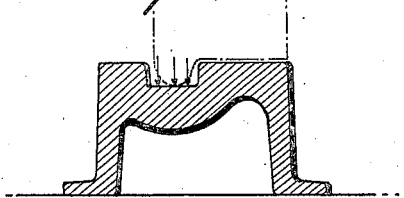
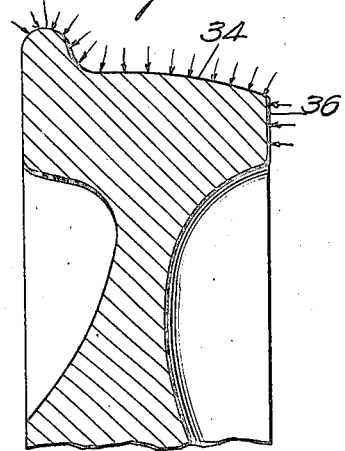
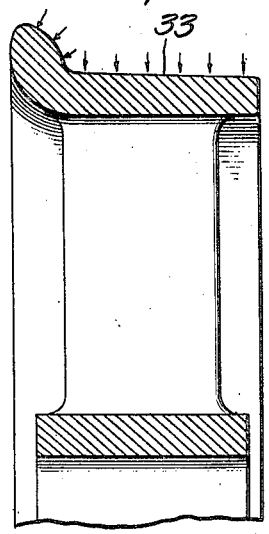
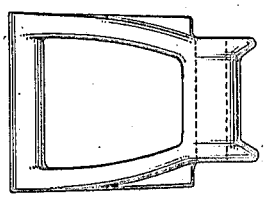

Feb. 12, 1929.                                    1,701,976
G. R. HANKS
METHOD OF CONDITIONING ARTICLES OF MANGANESE STEEL
Filed June 22, 1925          5 Sheets-Sheet 5
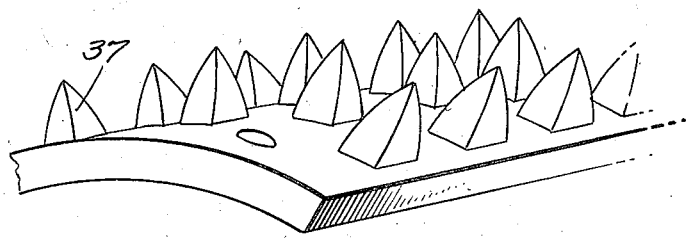
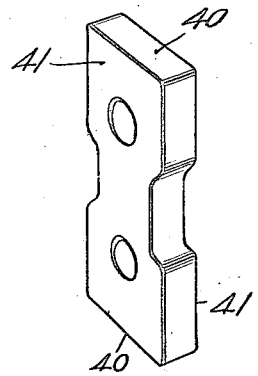
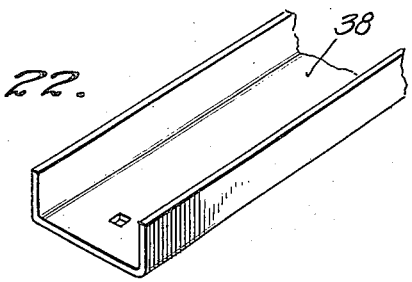
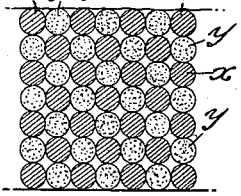
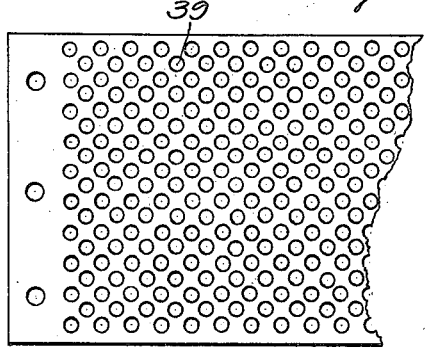
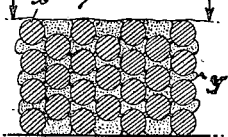
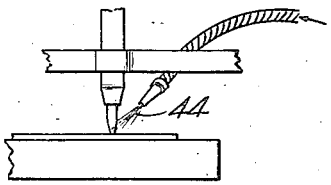
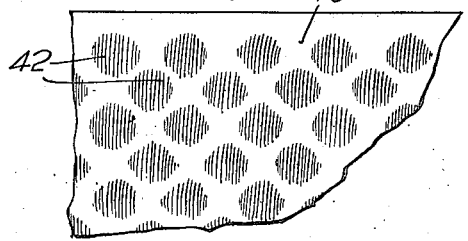
Inventor
GEORGE R. HANKS,
By  Jas. A. Richmond
Attorney Patented Feb. 12, 1929.

1,701,976

UNITED STATES PATENT OFFICE.

GEORGE R. HANKS, OF HIGH BRIDGE, NEW JERSEY, ASSIGNOR TO TAYLOR-WHARTON IRON AND STEEL COMPANY, OF HIGH BRIDGE, NEW JERSEY, A CORPORATION OF NEW JERSEY

METHOD OF CONDITIONING ARTICLES OF MANGANESE STEEL.

Application filed June 22, 1925. Serial No. 38,733.

As indicated, the invention relates to metal working and more particularly to the working of iron or steel alloy high in manganese irrespective of other components, whatever they may be, and what their relative proportions may be.

Commercial manganese steel, that is to say iron or steel alloy, containing from ten to fifteen per cent and preferably eleven to fourteen per cent manganese, and commonly referred to as "twelve per cent manganese steel" is remarkable for its toughness and wear-resisting properties and has proven, beyond the possibility of doubt, its superiority to other metals under sustained service conditions of shock and abrasion. When those conditions are lacking, particularly shock, manganese steel has not, heretofore, been a desirable application and certainly not an economic one. Under the influence of shock and abrasion it manifests the peculiarity of flowing and of constantly renewing the surface exposed to wear. In short, when conditions are right, it fits itself for service. This is largely the case with special trackwork, gyratory and jaw crushers, to mention but a few applications where manganese steel, because of its uniform toughness and hardness, following skillful heat treatment and quenching, has practically supplanted other metals.

While manganese steel of commerce is also without a peer in trackwork, for instance, in frogs, crossings, switches, mates, curves and other special work, strange to say, it is unsuitable for railway car wheels. It has also failed of ultimate economy in some classes of digging and drilling, where, perhaps due to the nature of the material operated upon, the work was not sufficiently punishing. And despite the ultimate economy of manganese steel in operations which exact a heavy toll in wear, its propensity to fit itself to the service unquestionably shortens its life. So also its peculiarity of flowing or stretching, under severe service, is a decided handicap and makes it necessary in some classes of work to resort to special tightening devices or clearance allowances.

The foregoing observations, the result of extended study and intimate knowledge gained by watching the behavior of high per cent or commercial manganese steel under all kinds of operating conditions, force the conclusion that the utter failure of manganese steel in certain industries and its singular handcaps in others in attributable to the circumstance that the ordinary methods of manufacture and treatment are not sufficient to develop all of the potentialities of high per cent manganese steel and certainly do not properly arm it.

One object of this invention is to broaden the scope of usefulness of commercial or substantially twelve per cent manganese steel and to make it a desirable and advantageous application even in the manufacture of wheels intended for railway service, and in the manufacture and use of other shapes or articles that heretofore have been deemed failures or have actually demonstrated their unfitness when constructed of manganese steel. Another object is to greatly prolong the life of the article, whatever it may be, by curbing its propensity to peen and flow as well as its wasteful effort in hardening or arming itself for service.

With such and other objects in view, the invention consists in developing the potentialities of high per cent manganese steel to initially fit it to economically cope with all classes and manner of work that involves abrasion of some kind or degree whether it be constant or intermittent and whether it be associated or unassociated with shock ranging from a maximum to a more or less negligible quantity; and my inventive thought, without regard to the manifold methods, practices, and means, that may be adopted to reduce it to practice, contemplates and essentially embodies any member, shape, or article constructed of high per cent manganese steel, that is to say iron or steel alloy, containing substantially ten to fifteen per cent manganese, in the ladle, and which has been heat treated and toughened in the usual way, whether said member, shape, or article, be cast, forged, rolled, pressed, or wrought, and thereafter that is to say after the toughening, differentially or selectively increasing the hardness of a surface or surfaces which in regular use are exposed to abrasion with or without shock, and effecting such hardness increment in the substantial absence of heat and of reagents and without impairing the inherent toughness of the body, and without regard to any physical or other change of cystalline structure, if any, whatever it may be, for the purpose and with the result of (1) for a service favorable or conducive to self-hardening,—obviating or restricting the self-hardening properties of the steel; (2) for a service not conducive to self-hardening, for example, abrasion without shock or where the shock is of such nature that its hardening influence is negligible,—presenting what may be termed a superhardened wear surface or a surface completely armed to receive and prolongedly and otherwise economically resist severe abrasion; (3) for a service marked by both shock and abrasion, but of variable kind and degree and of variable influence, if any, one upon the other,—presenting an abrasive-wear resisting surface whereof a part is fully developed to combat abrasion and a part is substantially undeveloped and is susceptible to development in service; (4) in any event and in all cases,—presenting a structure substantially fortified against undesirable or excessive flowing, stretching, or peening; and (5) presenting a structure having great body toughness combined with selective surface superhardness; and my invention further consists in the methods, improvements, and products, hereinafter described and finally set forth in the claims.

For a more comprehensive understanding of the nature of my invention and of its practicability in overcoming conditions daily encountered in the use of standard high per cent manganese steel as well as conditions which have absolutely precluded the use of such steel, I have annexed hereto certain drawings, to be hereinafter more particularly referred to, which illustrate, by way of example and in a comparative way, how the invention is availed of to arm the member, shape, or article for the particular service for which it was designed so that it will manifest ultimate economy in that service.

Figures 1 and 2 are, respectively, side and end views of apparatus suitable for practicing the invention.

Figure 3 is a perspective view of mill liner plates embodying the invention.

Figure 4 is a sectional view of the mantle and concave elements of a gyratory crusher.

Figure 5 is a perspective view of a dipper tooth.

Figures 6 and 7 are edge and sectional views of a digging lip.

Figure 8 is an elevational view of a conveyer flight.

Figures 9 and 10 are face and edge views of a cutter blade for a collapsible rotary drill.

Figure 11 is a sectional view of a rag slitter.

Figure 12 is a fragmentary perspective view of a beater roll for a Hollander engine.

Figures 13, 14 and 15 are views of a pump impeller and pump casing liner.

Figures 16 and 17 are sectional views of special trackwork.

Figure 18 is a sectional view of a mine car wheel.

Figure 19 is a sectional view of a railway car wheel.

Figure 20 is a top view of a chain link.

Figure 21 is an elevational view of a segment of a coal breaker roll.

Figure 22 is a perspective view of a chute.

Figure 23 is a top view of a screen plate.

Figure 24 is an elevational view of a hammer for a pulverizer mill.

Figure 25 is a diagrammatic view of a modification, which consists in spot working.

Figure 26 is a modification showing means to prevent elevated temperature in working.

Figures 27 and 28 are graphical representations, respectively, of unworked and worked high per cent manganese steel.

The foregoing views are representative of high per cent manganese steel constructions and it will be understood that they are typical and that the points of working illustrated by the arrows or other symbols are relative and not limitations of the area or areas to be worked.

As premised, this invention has utility in connection with commercial manganese steel and the members, shapes or articles exemplified in the drawings are constructed of that steel. Commercial manganese steel, under preferred practice, shows the following analysis:

| Carbon | Silicon | Manganese | Sulfur | Phosphorus |
|---|---|---|---|---|
| Per cent 1.00-1.40 | Per cent 0.3-0.8 | Per cent 11.0-14.0 | Per cent 0.01 | Per cent 0.06-0.10 |

To secure metal of this composition, about five parts of molten low carbon steel and one part of molten 80 per cent ferro-manganese are mixed in a ladle, the ferro-manganese containing the proper amounts of carbon and manganese to bring those elements in the resulting steel to the desired proportions. The necessary low-carbon steel may be prepared in a Bessemer converter, either bottom blown or side blown, in an open-hearth furnace, or in an electric furnace. The large manganese addition so thoroughly deoxidizes the low-carbon steel with which it is mixed that there is no discernible difference between the quality of manganese steel made from open-hearth, converter or electric-furnace metal, whatever may be the superiority of ordinary carbon or alloy steels made by one or another of these several methods. None the less, the electric furnace is of advantage in that it may be employed to remelt foundry scrap and defective or worn-out castings with little or no loss of the manganese, which would practically all be lost if the scrap were remelted in an open-hearth furnace or used as part of the cupola charge in converter practice. The manganese steel scrap, of course, may make up the entire charge of the furnace, or form a part only, depending upon the amount available.

The phosphorus content of commercial 80 per cent ferro-manganese being generally from 0.2 to 0.3 per cent, low-phosphorus pig iron and steel scrap have to be used for the charge of the Bessemer converter or acid open-hearth furnace in order to keep the phosphorus content of the manganese steel produced within proper limits. If a basic open-hearth furnace or a basic-lined electric furnace is used the phosphorus can, of course, be reduced to the desired point before mixing the ferro-manganese and the low-carbon steel, provided no manganese steel scrap is included in the charge. If manganese were present in the furnace bath in considerable amounts, it would all be oxidized and slagged during the removal of the phosphorus. For this reason de-phosphorizing is not even attempted in making manganese steel in the electric furnace, when manganese steel scrap forms any part of the charge.

Phosphorus in excess of 0.125 per cent lowers the strength and decreases the toughness of the steel. The phosphorus, therefore, is kept below 0.10 per cent, but for the reasons stated it is not commercially feasible to produce manganese steel with phosphorus below 0.06 per cent, and as it is necessary for reasons of economy to remelt the foundry scrap each day, the phosphorus in the steel usually varies from 0.075 to 0.095 per cent.

Sulfur is not a problem in the manufacture of manganese, as it combines with part of the manganese and is eliminated from the furnace bath or the ladle, so that it is seldom if ever present in amounts over 0.02 per cent, and manganese steel makers are not even obliged to analyze their product for sulfur, except occasionally for check.

The silicon content varies from 0.3 to 0.8 per cent depending largely upon the amount of silicon in the ferro-manganese. When within the range of one per cent, silicon has little influence upon the physical properties of the steel.

To keep the carbon below one per cent is impossible without using very expensive low-carbon ferro-manganese; and as a general proposition low-carbon manganese steels do not wear as well as the higher carbon steels ordinarily made. If the carbon is allowed to exceed about 1.40 per cent, the toughness of the steel is decreased, especially in the case of heavy castings, and with further increase of carbon the loss of toughness becomes very marked. The tendency of the heavier castings to crack in the molds or in heat treatment is much greater, too, when the carbon is high than when it is kept at about 1.15 to 1.25 per cent.

To insure proper toughness, manganese steel should contain not less than eleven per cent manganese. When the manganese exceeds fourteen per cent, the carbon is usually so high that the embrittling effect of the carbon counteracts any increase of toughness due to increased manganese content, so that fourteen per cent is the usual maximum for this element.

In addition to silicon, commercial or high per cent manganese steel may contain, in minor proportions so as not to change its identity, such alloying agents as, for example, aluminum, chromium, nickel, cobalt, titanium, molybdenum, tungsten, vanadium, zirconium, copper, etc., either singly or in various combinations, and my invention comprehends any iron or steel alloy, regardless of its components, so long as it analyzes ten to fifteen per cent, more or less, manganese.

Let it be assumed then that the member, shape or article, however it may be formed, whether by casting, forging, rolling or otherwise, has a composition conforming substantially to the specification stated, and has been heat-treated to give it the usual characteristic of toughness combined with hardness. The Brinell hardness of the steel in the heat-treated condition is only moderately high, about 185 in the untreated condition and 180 to 200 after treatment. Yet it is commercially unmachinable, the metal hardening in front of the tool so rapidly as to wear out the tool before the cut has progressed very far. And manganese steel almost certainly owes its power of resisting heavy abrasive wear to the property of hardening itself under cold working to an extent not approached by any other ferrous metal. In a jaw crusher, for instance, where the steel is subjected both to heavy pressure and to severe abrasion, manganese steel will outlast from five to ten times metals whose initial hardness is much greater. Tests show that the initial rate of wear of a manganese-steel crusher jaw is somewhat greater than the rate after a few tons of stone have been crushed; this difference in the case of small crusher jaws carefully weighed being from 0.13 g. lost per square inch of jaw surface per 1000 lbs. of stone crushed, for the first two tons of stone to 0.08 g. lost per square inch of jaw surface per 1000 lbs. of stone crushed after six or eight tons had been put through. This is due, of course, to the hardening of the steel by the kneading effect of the stone crushed. Jaws of other hard steels, such as nickel, chrome, nickel-chrome, chilled iron, etc., tested at the same time in the same crusher with the same stone, showed practically no difference in the rate of wear as the test progressed, and in consequence of their high initial rate of wear and of the fact that this rate decreased little if any as the test progressed, jaws of these steels were worn out after a life, measured in terms of tons of stone crushed, of only from one-tenth to one-fifth that of manganese steel. Singularly enough the tests showed that the lowering of the manganese content, provided the carbon was held constant, gave not poorer but rather better results in wearing rate, but the inevitable loss of toughness as the manganese content is decreased makes it impossible to take advantage of the better resistance to wear of the 6 or 8 per cent manganese steels.

Track structures are another of many typical instances where manganese steel owes its longevity of service to its self-hardening under stress.

Turning now to wear of a different type, where the metal is not subjected to heavy pressure with its resulting cold working, it is an incontrovertible fact that manganese steel does not develop the same resistance to wear as it does in, for example, crusher jaws, and in fact it may even wear out more rapidly than do the harder ferrous metals. To take an extreme case, manganese steel, under sand blast, wears as fast as plain 0.25 per cent carbon cast steel, and far faster than chilled iron. There are many classes of wear in which pressure is almost absent, and in such cases the abrasive action of fine particles of hard material like quartz, which cut into the surface of the steel, rapidly wears the metal away. Paradoxical as the statement may appear, a set of manganese steel steam shovel teeth will often last several months handling blasted rock of the hardest kind and wear out in ten days or two weeks digging into a bank of glacial clay or shale containing a large amount of quartz or other hard mineral in small particles. Evidently then, in the absence of the hardening effect of blows or pressure that dent and deform the steel, the resistance to wear is comparatively low.

Thus, we have the service where manganese steel shows marked power of resistance to abrasive wear due to self-hardening under cold working, but in which it suffers the handicap of distortion due to flowing, stretching and peening, and the other extreme of little or no resistance to abrasion, due to the substantial absence of cold working. There is another important matter to consider and that is that the hardening of the steel in service is responsible also for its greatest weakness, namely, a low resistance to repeated stress approaching or slightly exceeding its elastic limit. It is a merit of my invention that it so conditions the steel that any permissible self-hardening is so controlled or regulated that for all practical purposes the steel has a fatigue resistance substantially up to its potential elastic limit.

In the practice of my invention to arm high per cent manganese steel, I do not restrict myself to any specific method or means for cold working. Manifestly, this will depend largely on circumstances and conditions, such as the shape of the article, the extent of wear surface, thickness of metal section, the character and degree of working and the particular service for which the article was designed. The essential application of stress may be accomplished by rolling, pressing, hammering or by various combinations or modifications of those expedients. It is recognized that one has advantages over another or others, according to the particular work in hand. Whatever expedient is resorted to it must be of such nature as to be controllable at will for extreme care must be exercised in the working so as not to exceed that certain factor of safety beyond which there is danger of embrittling the structure, danger of impairing the inherent toughness of the body structure, and danger of lowering its resistance to fatigue. Accordingly, the stress application, whatever form it may embody, must not only be regulable at will, but the article must be supported appropriately to meet the stress without liability of internal or external injury whether such injury be of a nature immediately manifest or of a nature that may manifest itself in service. Preferably, in effecting the working, I aim to follow as far as practicable the advantages of service cold working without the disadvantages thereof.

Referring, by way of example, to the drawings, Figures 1 and 2 represent apparatus which has been highly successful in arming liner plates for ball mills. A base structure 5 has a roller path 6 to accommodate a jig or cradle 7 whose article supporting face 8 conforms to the shape of the article,—in this instance,—the liner plate 9. An overhead supported air hammer 10 is the medium for applying working stress. A ball or rod mill is an instance where there is wasteful self-hardening and excessive flowing, stretching and peening of the manganese steel present in the form of liner plates.

Figure 3 shows how the liner plates are associated in service and the cross marks may be regarded as a wear diagram and represent the areas which are worked stressed in accordance with the invention. By cold working these areas and preferably working one face or edge 11 alternately against another face or edge 12, I so arm the metal that there is little or no self-hardening in service and consequently no excessive flowing, stretching or peening.

As previously pointed out, I subject the article in a cold state to selectively gauged shocks, that is to say to the hardening effect of intermittent blows or stress applications that dent and deform the surface to which they are applied. For example, with reference to Fig. 2, the liner plate 9, supported preferably on a counterpart jig or cradle 7, and having been outlined for treatment according to the service wear diagram of Fig. 3, has its outlined portions subjected to the intermittent or repeated blows of an air hammer 10. The outlined portions are the faces cross-marked 11 and 12. Proper precaution should be taken not to work to the embrittling stage or the point where the essential balance of body toughness and superhardened surface is dangerously trespassed upon. Hence, the necessity for systematically controlling the work. The air hammer itself offers a medium for selectively gauging the shocks and another medium of control, preferably, is to accomplish the shocking in stages, that is to say, not to complete one area first, but to work or partially work a certain area of face 11 and then do the same to the face 12, from time to time, of course, testing the hardness produced, as, for example, by taking the Brinell number. It is apparent from the wear diagrams, Fig. 3, that the bulk of the liner plate is left unworked or possessed of its inherent body toughness and with only such surface hardness as is acquired under the regular heat treatment and quenching. The shocked portions exhibit dents or facial deformities and will resist wasteful peening or flowing of the liner plate under the punishing action of grinding elements when it is put into series. During the application of regulated shock or stress, any tendency towards the establishment of heat may be dissipated by the use of a blast, as at 44, in Fig. 26. Moreover, instead of deforming the entire outlined surface, I may spot work, as at 42; the worked areas being spaced by unworked areas 43, Fig. 25. The effect of this is to permit a restricted or curbed amount of self-conditioning of the metal when it is put into service.

Figure 4 represents the relative arrangement of the mantle or concave elements 13 and 14, respectively, of a gyratory crusher. The mantle especially, under ordinary practice is so prone to stretching or flowing that special devices are necessary to automatically or otherwise tighten it on the core. And because of self conditioning it suffers heavy wear in service. The stretch or wear are mainly prevalent in the lower half of each of the mantle or concave elements. Accordingly, I cold work the areas indicated by the arrows. The effect is remarkable. Not only is the service life of the element substantially prolonged but there is a substantial absence of stretching or flowing. In a measure this is probably aided by alternately working one face against the other.

Figure 5 represents a digging or so called dipper tooth. The degree of self-conditioning of devices of this nature depends on the character of the terrain or soil. If it is of a refractory nature there is much waste due to self-conditioning. Hence, dipper teeth are usually made reversible. To initially fit them for any service I preferably work the top or bottom jaws 15 and 16, and cutting edge 17, the web or other parts being left undisturbed. In some instances, such as with the larger sizes of teeth, I find it advantageous to also work a portion of the side faces. In fact, wherever there is a tendency to peen or stretch, I resort to working being careful not to disturb the essential balance of body toughness.

Figures 6 and 7 represent a conventional digging lip. Digging lips are not reversible, and since they take the brunt of the wear, must be replaced at frequent intervals. In practice, I find it generally sufficient to cold work the overhang, that is to say, the parts 18, 19 and 20.

Figure 8 represents a conveyor flight of the spiral type of variable cross-section increasing outwardly. To avoid unnecessary waste of metal in service it will generally be sufficient to work the wearing faces 21 and 22.

Figures 9 and 10 represent a cutter blade for rotary drills of the collapsible type. This has here been regarded as an undersirable application of manganese steel. It has been demonstrated, however, that by initially superhardening the wear faces 23, 24 and 25 and leaving the remaining metal tough and relatively unhard, manganese steel is not only efficient but superior to other metals for this class of service.

Figure 11 represents a rag slitter. In applying my invention thereto I find it generally sufficient to work the edges and ends of the blade, 26, the working gradually tapering off into the body as indicated by the brackets.

Figure 12, represents a beater roll for a paper making engine of the Hollander type. Beater rolls with solid cast blades of manganese steel are gradually replacing the old type of filled rolls because manganese steel is peculiarly adapted to meet the abuses and heavy wear of this manifestly rough service. The one fault or disadvantage is the peening of the tips of the blades. I eliminate this by stress-working the tips, 27, and portions of the side faces, 28, preferably working one against the other.

Figures 13, 14 and 15 are views of a pump impeller and a pump lining. To avoid waste of metal by self-conditioning under the action of sand and gravel, I initially work the impeller 29, the casing lining 30, and side plate 30'.

Figures 16 and 17 represent types of special trackwork. This is a striking example of the ability of manganese steel to fit itself in service. In applying the economical advantages of my invention thereto, I may, in the structure, Figure 16, anticipate self-conditioning by working the side walls, 31, and bounding edges, 32, of the groove and in the flange bearing structure, Figure 17, accomplish the desired result by working the bottom only of the groove.

Figure 18 represents a mine car wheel. In practice, wheels of standard make, peen or flow in the tread. I eliminate this by working the tread, 33, and that part of the flange in proximity thereto as indicated by the arrows.

Figure 19 represents a railway car wheel. Heretofore, manganese steel has proven a total failure in wheels of this type, mainly due to deformation in response to excessive flowing of the metal. After careful experimentation and actual trial, I find that I can overcome the disadvantage stated and provide a long-lived car wheel of superior strength and wear-resisting properties by cold-working certain areas against one another and preferably the tread, 34, flange, 35, and side wall, 36, care being taken not to disturb or materially affect the natural toughness of the body.

Figure 20 is typical of any manganese steel chain link whose wear portions may be substantially improved by my invention.

Figure 21 represents a coal breaker segment. My invention may be advantageously applied thereto by working all faces of the breaker elements, 37.

Figure 22 represents a chute. In applying the invention thereto, it is generally sufficient to work the bottom, 38.

Figure 23 represents a screen plate, whose wear face, 39, may be advantageously worked in accordance with my invention. This structure as well as the preceding one may be armed for service by cold rolling or pressing.

Figure 24 represents one of the hammers of a pulverizer mill. In order to eliminate peening I work the ends 40 and portions of the lateral faces 41.

Figure 25 is a diagrammatic view of a detail of the working. In some instances I may spot work the areas to be treated, that is to say, I may apply the desired stress at intervals 42 and leave substantially unworked intervals 43. As a matter of fact the latter are influenced to some extent by the actual working and substantially little waste occurs under self-conditioning.

Figure 26 is a further modification in the application of a spray or blast 44 of a cooling medium to check or dissipate heat due to working.

As previously remarked, extreme care must be exercised in the stress working, for example, in the application of the stress, the range of working, and the proper supporting of the shape or article undergoing working. Excessive working results in brittleness. It is well to conform as far as possible to the hardness developed in service. This, however, is not an absolute guide. Some worn articles which hardened themselves in service have shown a Brinell number of from 300 to 485. I have frequently and with excellent results hardened the metal by severe cold working well beyond the Brinell number 700, and with some classes of work have exceeded 800 Brinell. Hence, I am fixing no outside limit but merely caution not to work to brittleness, which, ultimately, means destruction. The unworked portions may respond to 180 to 200 Brinell, more or less.

The effect of severe cold working of high per cent manganese steel, in the manner hereinbefore described and particularly kneading or working one portion against another, apparently is a readjustment of the mass so that it may be said to be characterized by a tough or ductile body with a controllable depth of highly refractory or hard substances strongly manifested on the surface. This condition probably explains the overcoming of peening, stretching and flowing, the concentrated refractories constituting checks or barriers to stretching or flowing, and, being substantially inert to self-hardening, there is substantially no peening or other wasting such as is prevalent under conditions tending to self-fitting.

It is a merit of the invention that it can be practiced with any shape or article and without any substantial change in shape or special allowance or provision of excess metal for finishing within prescribed limits or dimensions.

Without limiting myself in any way I may add, with the view to a better understanding of the invention and of the remarkable results achieved thereby, that it is quite probable that the effect of systematic working is to convert the metal from the state of a solid solution to that of an aggregate. All the evidence throughout the field of metallurgy points to the fact that hardness is greater in an aggregate of a hard constituent dispersed throughout a soft matrix than it is in the case of the same soft matrix holding the hard constituents in a state of solid solution.

It seems certain that one direct result of my selective method of cold working of high per cent manganese steel is to cause the apearance of carbide. Obviously then the state of solution no longer exists since two constituents are visible under the high power microscope, i. e., the metal has changed from the state of a solid solution to that of an aggregate. A second result is the appearance of minute globular particles which etch white with nitric acid and which do not stain with boiling sodium picrate. These particles may be ferrite.

The appearance of carbide by mechanical work may be a physical manifestation of the grouping of hard particles together along lines of stress. For example, if a soft plastic substance, like putty, has uniformly distributed throughout its mass a large number of small hard particles such as shot, a state is produced on a large scale somewhat analogous to the state existing sub-microscopically in a solid solution of iron carbide in gamma iron if the carbon is assumed to be held in solution as iron carbide. The carbide particles are very hard in relation to the gamma iron and so the shot are hard in comparison to the putty. If the mass of putty and shot is worked the shot are not deformed but strike against each other and build up in groups. There is reason to believe that if the same relative state exists in the solid solution, i. e., hard particles of iron carbide and soft particles of gamma iron, then systematic mechanical working of such solid solution should cause the hard particles to group, and no matter how small they were originally, if worked sufficiently, groups will finally appear which can be resolved by high power methods.

Figs. 27 and 28 are graphical illustrations of the proposition. In the unworked specimen, Fig. 27, there is a state of solid solution of a hard constituent, iron carbide, as $x$, and a soft constituent, gamma iron, represented by $y$. It will be observed that the respective elements $x$ and $y$ have not lost their individuality but are so highly diffused in each other as to be invisible under the highest powers of the microscope. Shape, size, or relative proportions of each constituent are immaterial. Carbide particles are very hard. Gamma iron particles are very soft.

When the specimen, Fig. 27, is hammered or worked it is reasonable to assume that a condition is established (Fig. 28) in which the hard particles $x$ may be said to pile up and that the deformation is largely assumed by the softer material $y$. Austenite is generally regarded as a solid solution in gamma iron. A solid solution may be defined as a homogeneous union of two or more substances in indefinite proportions, this union persisting in the solid state and being so complete that the individual substances cannot be separated under the highest powers of the microscope. Chemical combination is not implied because if this were so the separate constituents would cease to exist as such.

The fact that iron carbide does appear along slip planes and otherwise throughout the metal is quite suggestive that the carbon must be in solid solution as iron carbide. The more the metal is worked the more resistant it becomes because the additional work causes the appearance of more carbide. As work continues the carbide particles become larger and literally cut the cementing material,—the gamma iron,—to pieces, and ultimately, if the working is continued, the metal will no longer hold together. It seems unlikely that the cold working causes two or more carbide particles to coalesce although such may be a fact. In all probability the gamma iron acts as the cementing medium. From the grain count of worked and unworked specimens it seems certain that the increase in hardness cannot be attributed to grain refinement. It is, therefore, my opinion that the promotion of hardness, and the substantial immunity to peening, stretching and flowing, characteristic of high per cent manganese steel mechanically worked according to my invention, are due to a condition evolved by my method of working wherein very fine particles of iron carbide in solid solution group themselves into the state of an aggregate,—a very hard constituent highly dispersed throughout a soft matrix. At any rate unworked specimens show no carbide.

Having described my invention, I claim:

1. The method of conditioning alloy steel shapes or articles containing ten to fifteen per cent of manganese for the purpose and with the result of obviating wasteful self-conditioning in service, which consists in subjecting the areas normally exposed to service self-conditioning to selectively gauged shocks applied while the article is cold and before it is put into service.

2. The method of conditioning alloy steel shapes or articles containing from ten to fifteen per cent of manganese, for the purpose and with the result of minimizing peening and flowing of the metal in service, which consists in preparing a wear diagram of a corresponding worn article and cold working the new article in accordance with the diagram.

3. The method of treating a shaped commercial manganese steel article to prolong its useful life, which comprises subjecting selected surface areas of the article, before it is put into service, to repeated predetermined mechanical stress in the absence of heat and while maintaining the original shape of the article.

4. The method of treating a shaped commercial manganese steel article to prolong its useful life, which comprises treating it, before it enters service, by subjecting selected surface areas, which are the areas normally exposed to wasteful self-conditioning in service, to selective shock applied cold and under original shape-retaining conditions and under conditions which will not endanger the essential balance of body toughness.

In testimony whereof I affix my signature.

GEORGE R. HANKS.